(12) United States Patent
Farrar et al.

(10) Patent No.: US 12,221,079 B1
(45) Date of Patent: Feb. 11, 2025

(54) LEVELING BLOCK SET

(71) Applicant: CAMCO MANUFACTURING, LLC, Greensboro, NC (US)

(72) Inventors: Lucas Farrar, Oak Ridge, NC (US); Niko Jovicevic, Statesville, NC (US); Bruce Andrew Angel, Stokesdale, NC (US); Brandon Blakely, Burlington, NC (US)

(73) Assignee: Camco Manufacturing, LLC, Greensboro, NC (US)

( * ) Notice: Subject to any disclaimer, the term of this patent is extended or adjusted under 35 U.S.C. 154(b) by 0 days.

(21) Appl. No.: 18/446,991

(22) Filed: Aug. 9, 2023

(51) Int. Cl.
*B60S 11/00* (2006.01)

(52) U.S. Cl.
CPC ..................... *B60S 11/00* (2013.01)

(58) Field of Classification Search
CPC .................. B60S 11/00; F16M 11/00
See application file for complete search history.

(56) References Cited

U.S. PATENT DOCUMENTS

| | | | | |
|---|---|---|---|---|
| 3,065,680 | A * | 11/1962 | Wiedman, Sr. | ......... E01F 9/588 404/6 |
| 4,034,961 | A * | 7/1977 | Breen | ....................... B60T 3/00 254/94 |
| 4,073,454 | A * | 2/1978 | Sauber | ...................... F16M 7/00 248/188.8 |
| 4,311,237 | A | 1/1982 | Hayes | |
| 4,645,416 | A | 2/1987 | Weiner | |
| 4,819,910 | A * | 4/1989 | Johnston | ................. B66F 7/243 254/88 |
| 5,273,351 | A * | 12/1993 | Rubel | .................... F16B 37/048 305/180 |
| 5,328,154 | A | 7/1994 | Blatz et al. | |
| 5,458,315 | A | 10/1995 | Blatz et al. | |
| 5,540,329 | A | 7/1996 | Vogeley | |
| 6,718,588 | B1 | 4/2004 | Frederiksen | |
| 6,752,381 | B2 | 6/2004 | Colak et al. | |
| 7,040,461 | B2 * | 5/2006 | Chrisco | ..................... B60T 3/00 D12/217 |
| 7,344,051 | B2 | 3/2008 | Flamingo et al. | |
| 7,980,532 | B2 | 7/2011 | Wickwire | |
| 8,002,241 | B1 * | 8/2011 | Shaw | ........................ B60P 3/36 254/5 C |
| 8,573,609 | B1 | 11/2013 | Moser et al. | |
| 8,672,597 | B2 * | 3/2014 | Selle | ..................... F16B 37/065 411/181 |

(Continued)

*Primary Examiner* — Monica E Millner
(74) *Attorney, Agent, or Firm* — Tuggle Duggins P.A.; Blake P. Hurt; Reinier R. Smit (57) ABSTRACT

A leveling block set with a handle, leveling blocks, and a receiver for leveling a large vehicle like a camper or trailer. Each leveling block has a top surface, sidewall, bottom surface, and a void defined by the sidewall and bottom surface. An opening in the top surface creates a channel that accepts and retains a portion of the receiver and the handle. The receiver has a base and shank with a passageway forming a second engagement member. The handle has a grip and shaft with a first engagement member. The shaft can be inserted through the channel to mechanically engage with the second engagement member of the receiver. The receiver is secured in the channel by two shoulders formed in the channel. If the receiver is lost or damaged, a replacement can be inserted without replacing the leveling blocks.

11 Claims, 8 Drawing Sheets

(56) References Cited

U.S. PATENT DOCUMENTS

| | | | |
|---|---|---|---|
| 8,782,839 B1* | 7/2014 | Forbis | B66F 7/243 |
| | | | 254/88 |
| 10,053,344 B1 | 8/2018 | Angel et al. | |
| 10,501,058 B2* | 12/2019 | Rancourt | B60T 3/00 |
| 11,673,440 B2* | 6/2023 | Haddock | B60D 1/66 |
| | | | 248/176.3 |
| 11,891,285 B2* | 2/2024 | Fife | B66F 7/243 |
| 2003/0146422 A1* | 8/2003 | Funk | B66F 7/243 |
| | | | 254/88 |
| 2005/0167547 A1 | 8/2005 | McLellan | |
| 2012/0090925 A1* | 4/2012 | White | B60S 9/08 |
| | | | 188/32 |
| 2015/0028177 A1* | 1/2015 | Vargas | B60S 9/02 |
| | | | 248/542 |

* cited by examiner

LEVELING BLOCK SET

FIELD OF THE INVENTION

The disclosure herein pertains to a leveling system for relatively large vehicles such as recreational vehicles, campers, trailers, and the like, and more particularly pertains to an improved leveling block set including a plurality of leveling blocks, a handle, and a receiver that is removable from the leveling blocks to facilitate the plurality of leveling blocks to stack and the handle and receiver to couple together to secure the leveling blocks during storage and transport.

DESCRIPTION OF THE PRIOR ART AND OBJECTIVES OF THE INVENTION

Various systems, devices and methods are available to level relatively large vehicles such as recreational campers, trailers, and the like. It is oftentimes desirable to level a vehicle, especially a recreational vehicle or camper, while parked for the comfort of any occupants and for the proper orientation and operation of any furnishings and appliances within the recreational vehicle or camper. Many current approaches include containers, boxes, cases, or bags for storing and transporting leveling blocks but suffer from various problems, drawbacks, deficiencies, and disadvantages. The containers are usually made of a sturdy fabric, canvas or plastic material and may include one or more handles, straps, etc. for lifting and carrying the containers with the leveling blocks stored inside. As a result, the containers significantly increase the weight and material cost of the leveling system. In addition, the containers are generally bulky, and thus require additional space for storage, as well as additional shelf space for display in a retail environment. Furthermore, unless the container is made of a substantially transparent material, such as clear plastic, the functional design, geometry and aesthetics of the leveling blocks are not immediately and readily visible to a potential purchaser. One example of a multi-tiered system of leveler units for leveling a vehicle is disclosed in U.S. Pat. No. 5,328,154 issued Jul. 12, 1994, to Blatz et al., and is commercially available from Tri-Lynx Corporation of Irving, Tex., USA under the trademark LYNX LEVELERS®. The leveling units consist of molded plastic or metallic blocks having a stackable, nesting and interlocking geometry for varying the overall height of a stack of the leveling blocks and preventing the leveling blocks from sliding relative to one another. The LYNX LEVELERS® system of leveler units and other commercially available leveling blocks typically include a container, box, case, bag or the like as described above for storing and transporting the leveling blocks which is not desirable.

Another example of a leveling block set is disclosed in U.S. Pat. No. 10,053,344, granted Aug. 21, 2018, entitled LEVELING SYSTEM INCLUDING STORAGE AND TRANSPORT HANDLE assigned to Camco Manufacturing, Inc., the assignee of the instant application, the entire disclosure of which is hereby incorporated by reference. The Camco set, unlike the Tri-Lynx product, includes a carrying handle disposed through the center of the leveling blocks for more advantageous transportation and storage. However, the Camco product must be completely replaced if the bottommost leveling block, which contains the attachment engagement member, is lost or damaged.

Thus, it is apparent a need exists for an improved leveling system for relatively large vehicles, such as recreational vehicles, campers, trailers, and the like. A more particular need exists for a leveling system that does not require a container, box, case, or bag for storing and transporting the leveling blocks. A still further need exists for a leveling block set that includes a removable receiver that is configured to be removed from the leveling block body and replaced without needing to discard or replace the remainder of the set. In view of the problems, drawbacks, and disadvantages associated with the existing leveling systems, the present disclosure was conceived and one of its objectives is to provide a leveling block set including a plurality of leveling blocks, a handle, and a removable receiver, the handle and receiver configured to releasably secure the plurality of leveling blocks together.

It is another objective of the present disclosure to provide a leveling block set including a plurality of leveling blocks including a body having an opening formed in the center.

It is still another objective of the present disclosure to provide a leveling block set including a plurality of leveling blocks, a top surface of at least one of the plurality of leveling blocks defining a recess configured to receive at least a portion of the handle therein.

It is yet another objective of the present disclosure to provide a leveling block set including a plurality of leveling blocks and a handle, the handle further including a grip and a shaft.

It is a further objective of the present disclosure to provide a leveling block set including a plurality of leveling blocks, a handle further including a grip and a shaft, the shaft including a portion defining a first engagement member, and a receiver defining a second engagement member, the first engagement member configured to couple with the second engagement member.

It is still a further objective of the present disclosure to provide a leveling block set comprising a plurality of leveling blocks with an opening formed in a top surface extending through the body of the leveling blocks via a channel to be in communication with a void formed in a bottom surface and a sidewall of the leveling blocks.

It is yet a further objective of the present disclosure to provide a leveling block set comprising a plurality of leveling blocks with an opening formed in a top surface extending through the body of the leveling blocks via a channel, the channel sized and shaped to accept a receiver therein, the receiver secured within the channel by virtue of upper and lower shoulders configured to retain a receiver lip and a receiver base, respectively.

Various other objectives and advantages of the present disclosure will become apparent to those skilled in the art as a more detailed description is set forth below.

SUMMARY OF THE INVENTION

The aforesaid and other objectives are realized by providing a leveling block set including a handle, a plurality of leveling blocks, and a receiver removable from at least one of the plurality of leveling blocks for leveling a relatively large vehicle such as a recreational vehicle, camper, trailer and the like. In one embodiment, each of the plurality of leveling blocks are formed from a body with a top surface, a sidewall, a bottom surface, and a void defined by the bottom surface and sidewall. An opening in the top surface extends through the body of each of the plurality of leveling blocks creating a channel in communication with the void, the channel sized and shaped to accept and retain the receiver therein. The receiver is formed by a base and a shank extending from the base, the shank terminating at an end in opposing relation to the base at a lip. The shank defines a passageway therethrough that forms a second engagement member therein. The handle includes a grip and a shaft extending from the grip, terminating at an opposing end relative to the grip and defining a first engagement member. The shaft is sized and shaped to be inserted through the channel to position the first engagement member to mechanically engage with the second engagement member of the receiver. The receiver is secured within the channel with the lip retained within a first shoulder and the base retained within a second shoulder, each of the first and second shoulders defined within the channel. In the event that the receiver is lost or damaged, a replacement receiver may be inserted into the channel to restore the functionality of the leveling block set without needing to replace any of the leveling blocks.

DETAILED DESCRIPTION OF THE PREFERRED EMBODIMENT AND OPERATION OF THE INVENTION

Various exemplary embodiments of the present disclosure are described below. Use of the term "exemplary" means illustrative or by way of example only, and any reference herein to "the disclosure" is not intended to restrict or limit the disclosure to exact features or step of any one or more of the exemplary embodiments disclosed in the present specification. References to "exemplary embodiment", "one embodiment", "an embodiment", "various embodiments", and the like may indicate that the embodiment(s) of the disclosure so described may include a particular feature, structure, or characteristic, but not every embodiment necessarily incudes the particular feature, structure, or characteristic. Further, repeated use of the phrase "in one embodiment", "in an exemplary embodiment", or "in an alternative embodiment" do not necessarily refer to the same embodiment, although they may.

It is also noted that terms like "preferably", "commonly", and "typically" are not utilized herein to limit the scope of the disclosure or to imply that certain features are critical, essential, or even important to the structure or function of the disclosure. Rather, these terms are merely intended to highlight alternative or additional features that may or may not be utilized in a particular embodiment of the present disclosure.

The present disclosure is described more fully hereinafter with reference to the accompanying figures, in which one or more exemplary embodiments of the disclosure are shown. Like numbers used herein refer to like elements throughout. The disclosure may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limited as to the scope of the disclosure, and any and all equivalents thereof. Moreover, many embodiments such as adaptations, variations, modifications, and equivalent arrangements will be implicitly disclosed by the embodiments described herein and fall within the scope of the instant disclosure.

Although specific terms are employed herein, they are used in a generic and descriptive sense only and not for the purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. Where only one item is intended, the terms "one and only one", "single", or similar language is used. When used herein to join a list of items, the term "or" denotes at least one of the items but does not exclude a plurality of items of the list.

For exemplary methods or processes of the disclosure, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present disclosure.

Additionally, any references to advantages, benefits, unexpected results, or operability of the present disclosure are not intended as an affirmation that the disclosure has previously been reduced to practice or that any testing has been performed. Likewise, unless stated otherwise, use of verbs in the past tense (present perfect or preterit) is not intended to indicate or imply that the disclosure has previously been reduced to practice or that any testing has been performed.

Leveling systems for leveling such vehicles are commonly referred to as "jack pads", "stacker blocks", "leveling pads", and/or "leveling blocks". For purposes of convenience only, and in no way to be considered a limitation of the instant disclosure, the term leveling blocks is used generically herein to describe various exemplary embodiments of the present disclosure.

Figure 1:
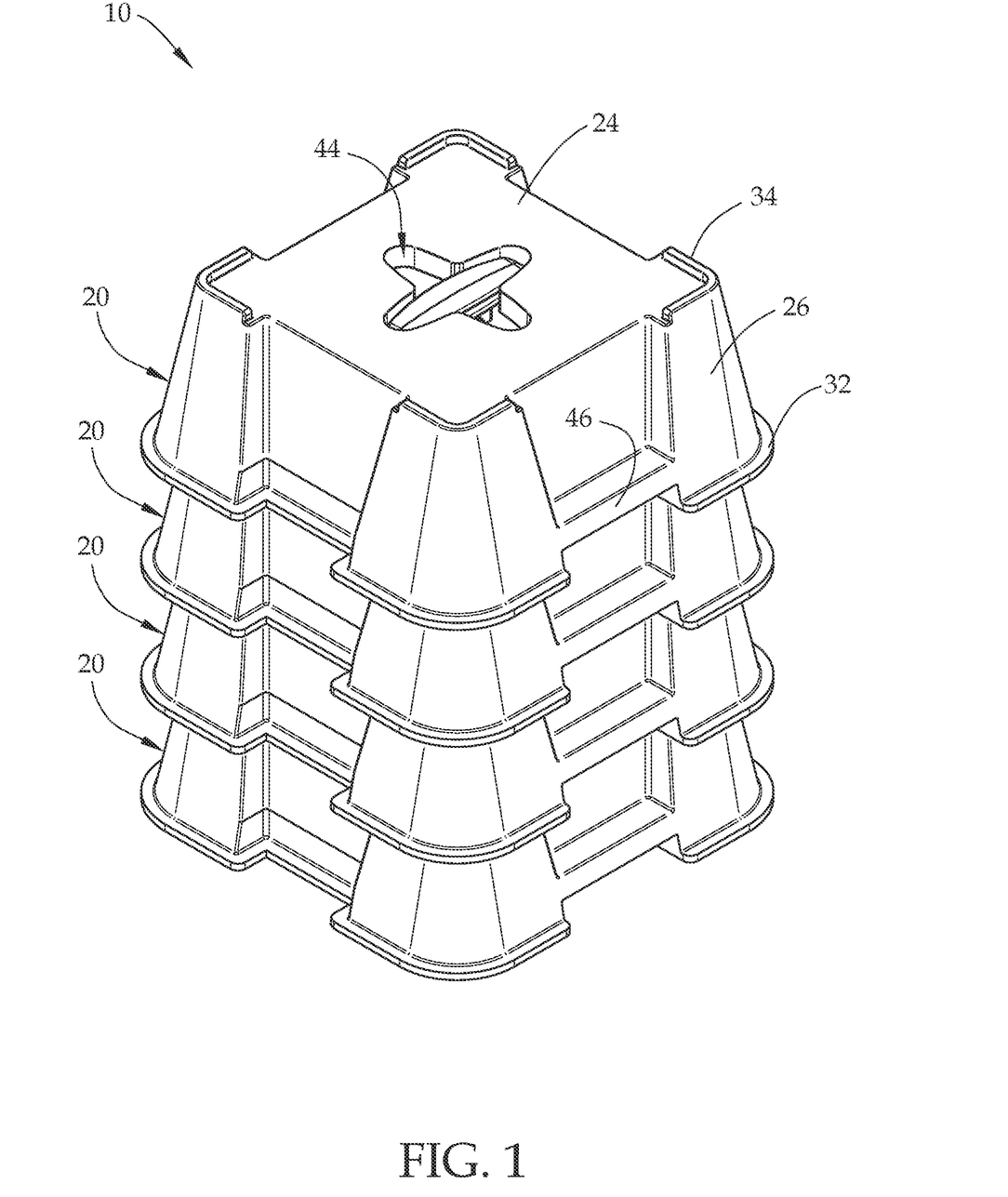
FIG. 1 shows an elevational perspective view illustrating a plurality of leveling blocks according to the present disclosure operable for leveling a vehicle.
Figure 3:
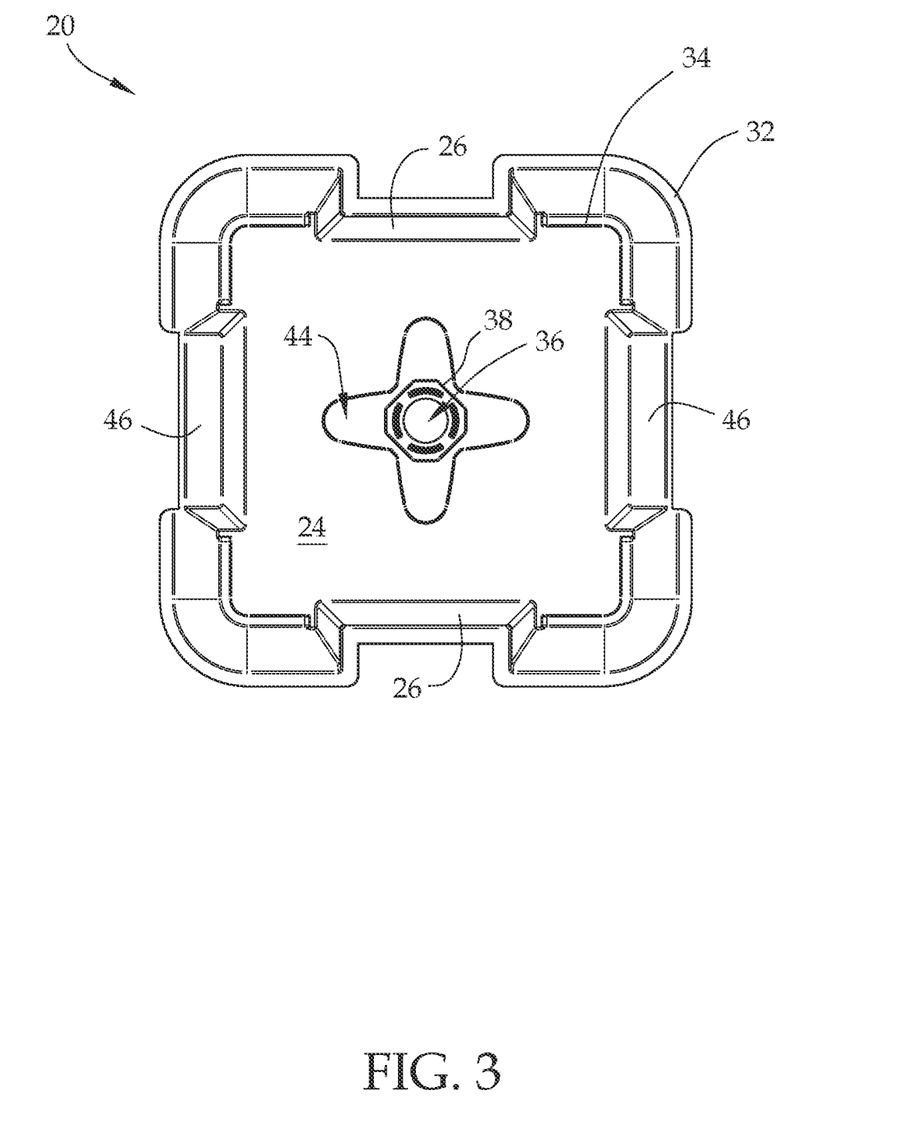
FIG. 3 depicts a top plan view of a leveling block of FIG. 1.
Figure 4:
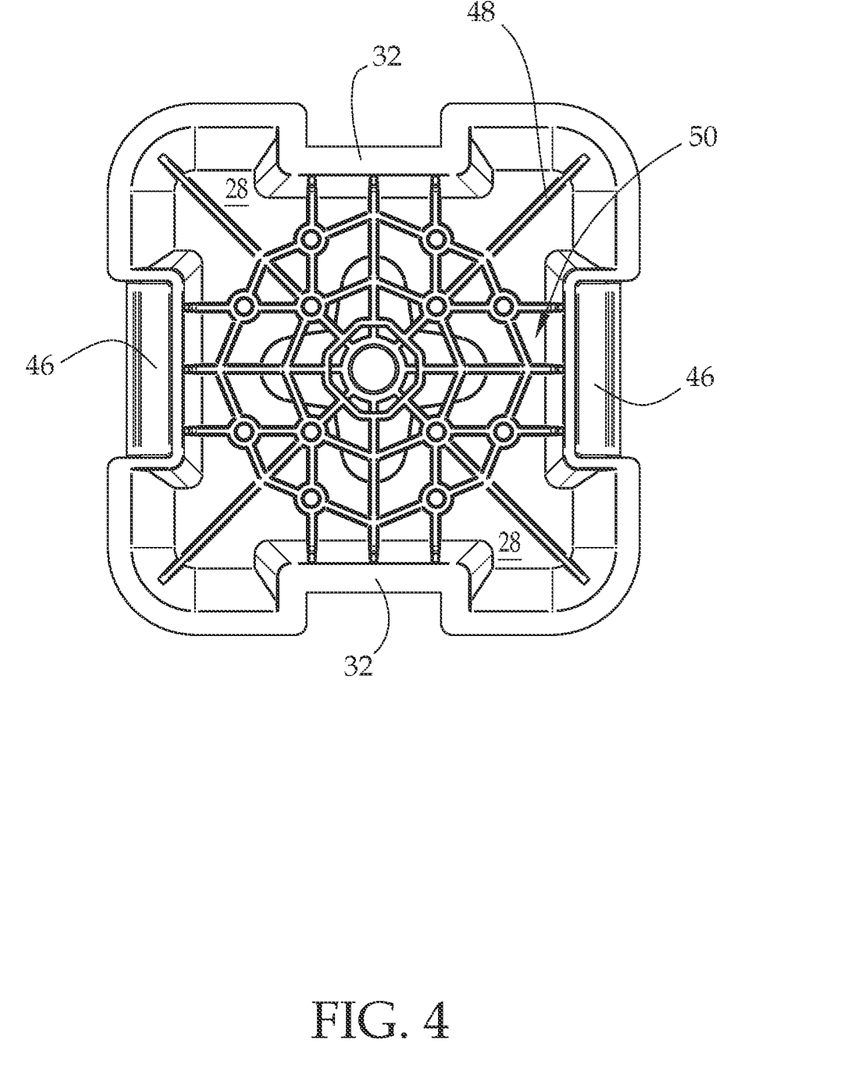
FIG. 4 demonstrates a bottom plan view of a leveling block of FIG. 1.
Figure 5:
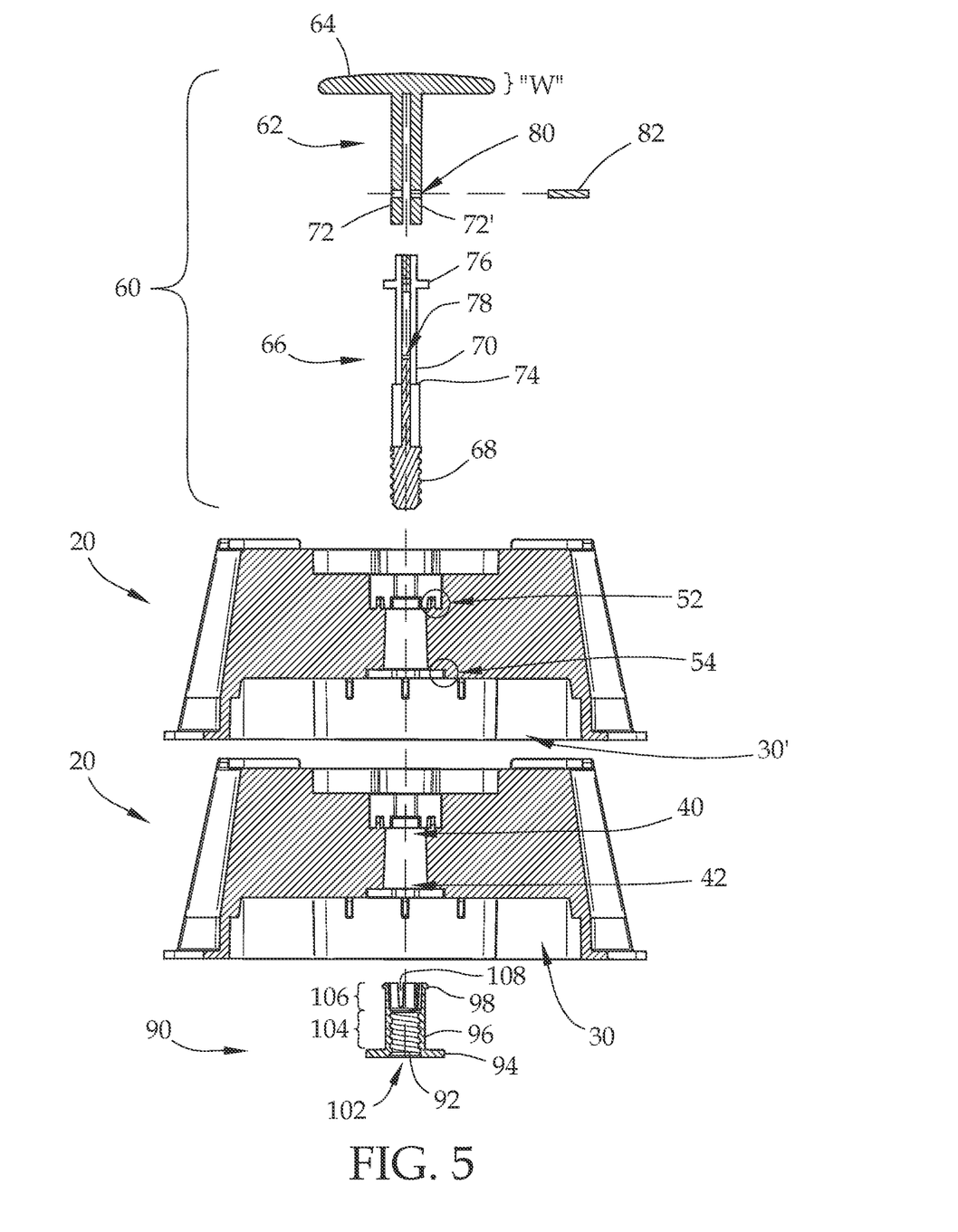
FIG. 5 illustrates an exploded cross-sectional view of a leveling block set according to the present disclosure including a plurality of leveling blocks, a handle, and a receiver in an unassembled configuration.
Figure 6:
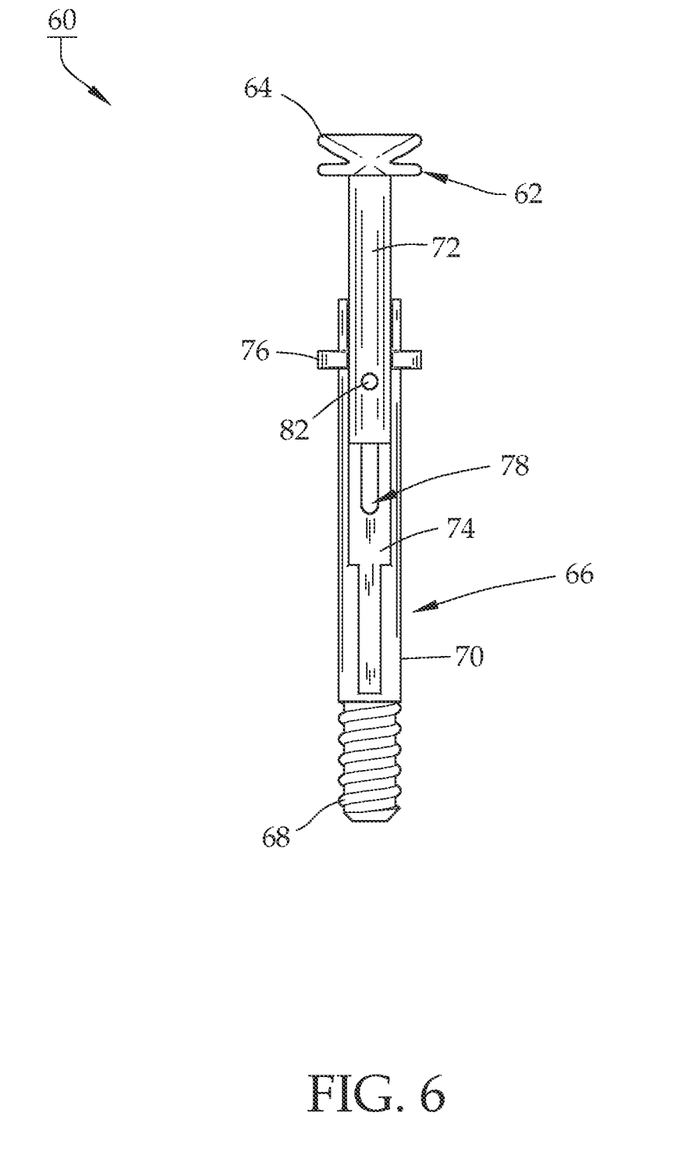
FIG. 6 pictures a side view of the handle of FIG. 5 in greater detail.
Figure 7:
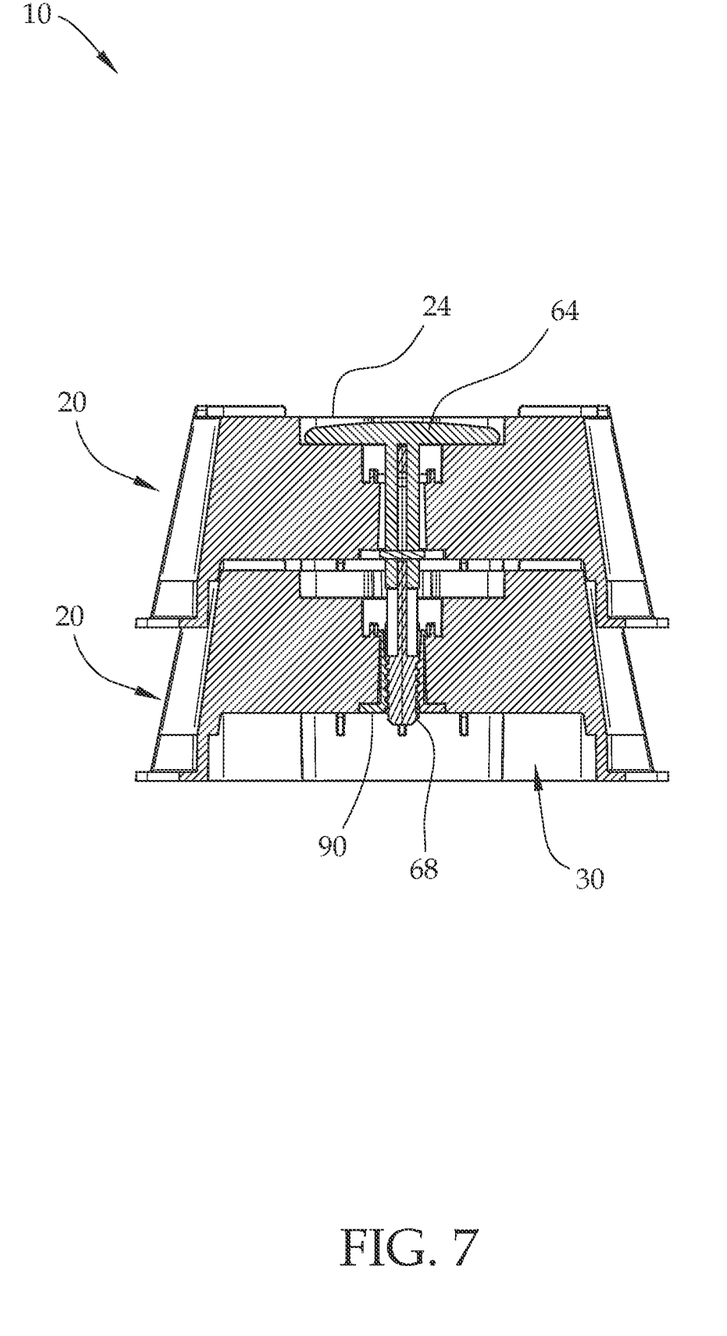
FIG. 7 shows a cross-sectional view of the leveling block set of FIG. 5 in an assembled configuration with the handle in a stored position.

For a better understanding of the disclosure and its operation, turning now to the drawings, FIGS. 1-8 illustrate a leveling block set operable for leveling a relatively large vehicle such as a recreational vehicle, camper, trailer, or the like. FIG. 1 shows the leveling block set, indicated generally by reference character 10. The leveling block set 10 preferably includes a plurality of leveling blocks 20, a handle 60, and a receiver 90 removable from at least one of the leveling blocks 20. In the preferred method of use, a desired number of leveling blocks 20 are positioned, stacked, or otherwise nested as necessary to form a platform of a desired height for receiving one or more wheels of a vehicle at a suitable height to level the vehicle in a known manner. In an alternative method of use, a desired number of leveling blocks 20 are positioned, stacked, or otherwise nested as necessary to form a platform of a desired height and sufficient stability for receiving a car jack, automotive stand, or other automotive accessory commonly used to lift, level, and/or support a relatively large vehicle such as a recreational vehicle, camper, trailer, or the like. By way of example only and not limitation, as shown in FIG. 1, the preferred leveling block set 10 may comprise a total of four (4) leveling blocks 20 that are stackable together in the manner previously described. In alternative embodiments, as shown in FIGS. 5-7, the leveling block set 10 may comprise a total of two (2) leveling blocks 20.

Figure 2:
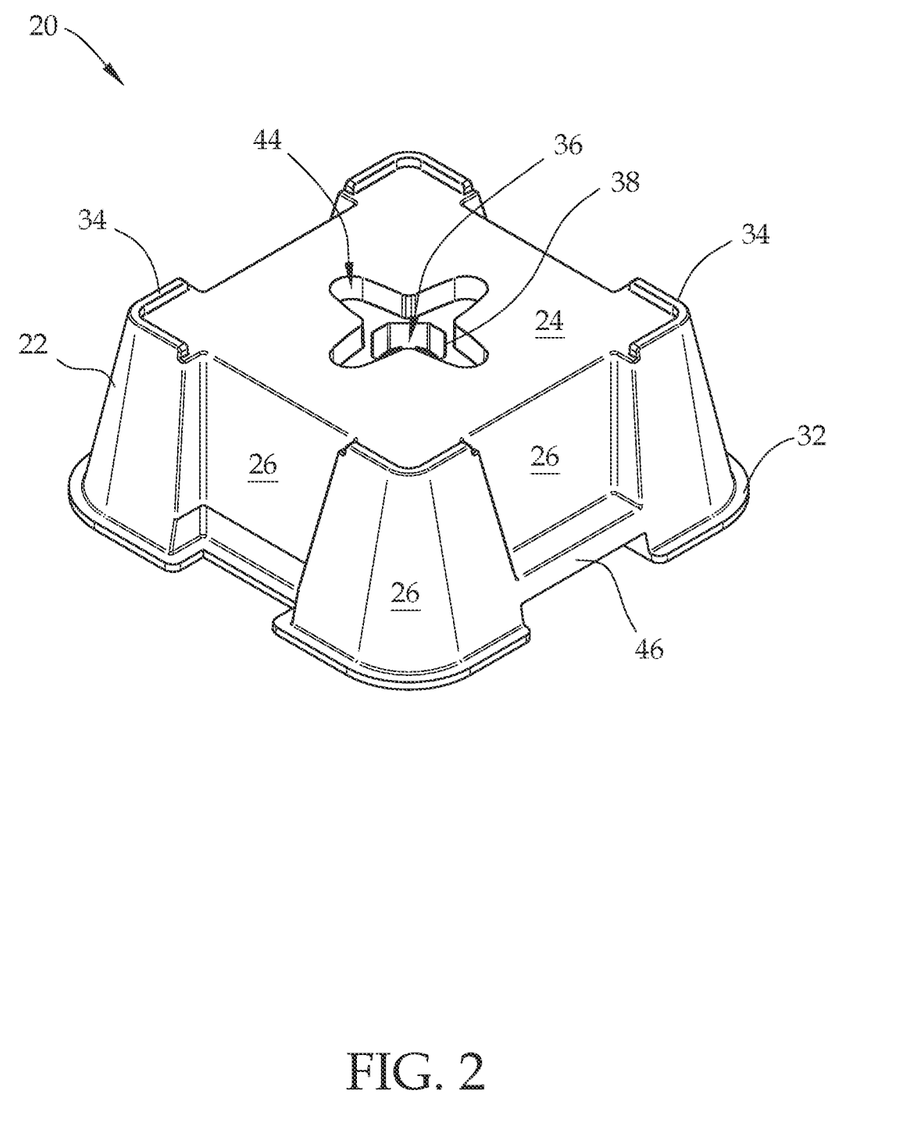
FIG. 2 pictures a perspective view of a leveling block of FIG. 1.

FIG. 2 shows a perspective view of the leveling block 20 of the present disclosure. In one embodiment, each of the leveling blocks 20 are formed from a body 22 with a top surface 24, a sidewall 26, a bottom surface 28, and a void 30 defined by the bottom surface 28 and sidewall 26. Each leveling block 20 is preferably formed of a relatively lightweight, yet durable and sturdy material having a high strength to weight ratio, such as molded plastic, thermoplastic, or composite. By way of example only and not limitation, the leveling blocks 20 may be formed of hard plastic material or lightweight metal material. Regardless of the material used, each leveling block 20 preferably comprises a body 22 generally defining a bottom length "B-L", a bottom width "B-W", a top length "T-L", a top width "T-W", and a height "H", with the bottom length "B-L" and the bottom width "B-W" each being greater than the top length "T-L" and the top width "T-W", respectively, such that the body 22 defines a truncated pyramid shape with a drafted sidewall 26. As shown herein, the bottom length "B-L" and the bottom width "B-W" may be substantially equal so that the leveling blocks 20 define a generally square footprint. However, leveling blocks 20 may define any desired shape or footprint, polygonal or non-polygonal, suitable for stacking and nesting in the manner previously described with respect to FIG. 1. The sidewall 26 preferably extends outwardly and downwardly in a tapered manner and terminates at an end and defines a flange 32 configured to sit flush on a surface on which the leveling block 20 is placed.

In one embodiment, preferred leveling blocks 20 comprise at least one rib 34 positioned on the top surface 24 and that project(s) outwardly from the top surface 24. In the preferred embodiment, the leveling block 20 comprises four (4) ribs 34 arranged symmetrically about the outer periphery of the top surface 24, most preferably at each corner of the top surface 24. In the preferred embodiment, the leveling blocks 20 may each comprise four (4) ribs 34 configured (i.e., sized, shaped, and otherwise capable) to cooperatively constrain a wheel of a vehicle, or an accessory used to lift, level, or otherwise support a relatively large vehicle, such as a recreational vehicle, camper, trailer, or the like, on the platform created by the top surface 24 of the leveling block 20. The ribs 34 may also be configured to collectively constrain another leveling block 20 or alternate leveling block (not shown) sized and shaped to fit within the ribs 34 on the top surface 24 of the leveling block 20.

As illustrated in FIGS. 2, 3, and 5, the top surface 24 of the leveling block 20 may be substantially planar and continuous, except for an opening 36 defined in the top surface 24 that extends through the body 22 creating a channel 38 in communication with the void 30. In the preferred embodiment seen best in FIG. 5, the channel 38 defines a tapered channel such that a top portion 40 of the channel 38 defines a diameter that is less than a diameter of a bottom portion 42 of the channel 38, as will be described later herein. The top surface 24 of the leveling block 20 may further define a recess 44 configured (i.e., sized, shaped, and otherwise capable) to receive at least a portion of the handle 60 therein. In the preferred embodiment, the opening 36 and the recess 44 are substantially concentric. The preferred recess 44, as shown in the figures, defines a cross-shaped indentation configured (i.e., sized, shaped, and otherwise capable) to receive an entire width "W" of a grip 62 of the handle 60 so that the grip 62 may be fully recessed within the recess 44 and a top surface 64 of the grip 62 is positioned below with the top surface 24 of the leveling block 20. The cross-shaped nature of the recess 44 preferably facilitates the storing of the grip 62 of the handle 60 in two different orientations to provide flexibility to the user when manipulating the handle 60. More detailed disclosure regarding the handle 60 is disclosed below, in connection with FIGS. 5-7.

The leveling block 20 may further include a bar 46 carried by the sidewall 26, the bar 46 configured to define a handhold for manual engagement of at least one of the plurality of leveling blocks 20, on at least one side, and preferably formed in opposing relation on two sides of a leveling block 20. The bar 46 may be integrally formed with the sidewall 26, or the bar 46 may be a separable component capable of being fastened onto the body 22 of the leveling block 20.

FIG. 4 demonstrates a bottom plan view of a preferred leveling block 20 of FIG. 1. The bottom surface 28 of the leveling blocks 20 may comprise a symmetric pattern of walls 48 interspaced with hollow cells 50. As would be understood by those skilled in the art, the pattern of walls 48 and hollow cells 50 reduce the overall weight of the leveling block 20, while maintaining sufficient strength and rigidity for supporting, for example, a large vehicle. It should be noted, however, that the particular pattern of walls 48 and hollow cells 50 shown herein is for purposes of explanation only and that any suitable pattern of walls 48, stiffeners, or the like and hollow cells 50, openings, recesses, and the like may be utilized without departing from the intended scope of the present disclosure. In an alternative embodiment, the leveling block 20 (other than the opening 36 and recess 44) may be made solid through its thickness between the top surface 24 and the bottom surface 28 such that there are no hollow cells 50 formed.

FIG. 5 presents an exploded perspective view of a leveling block set 10 in an unassembled state. The preferred leveling block set 10 includes multiple leveling blocks 20, a handle 60, and a receiver 90. The preferred handle 60, as shown in FIGS. 5-8, may include a grip 62 and a shaft 66 extending from the grip 62, terminating at an opposing end relative to the grip 62 and defining a first engagement member 68. In the preferred embodiment, the grip 62 and the shaft 66 may be separable components, however, in alternative embodiments, the grip 62 and the shaft 66 may be integrally formed. The shaft 66 is ideally sized and shaped to be inserted through the channel 38 to position the first engagement member 68 to mechanically engage with a second engagement member 92 of the receiver 90, as will be described further below. In one embodiment, the shaft 66 comprises a generally cylindrical body 70 defining the first engagement member 68 at a longitudinal distal end. The grip 62 may provide a pair of elongated rods 72, 72' and the cylindrical body 70 of the shaft 66 defines a central, longitudinal recess 74 configured (i.e., sized and shaped) to receive each of rods 72, 72' therein to allow the rods 72, 72' to displace within the central, longitudinal recess 74. If desired, the shaft 66 may be provided with a stop portion 76 positioned proximate the longitudinal limit of elliptical aperture 78 so as to engage with a first shoulder 52 formed in the channel 38 through the leveling block 20, as will be described in further detail below. Stop portion 76 may be, for example, an annular cylindrical or semi-cylindrical protrusion that projects radially outwardly from the body 70 of the shaft 66. In addition, rods 72, 72' of the grip 62 and the central, longitudinal recesses 74 of the body 70 of the shaft 66 may define a mechanical shoulder or stop for limiting the travel of the grip 62 in a downwards (i.e., towards the first engagement member 68) direction. A through hole 80 may be defined on the grip 62 and configured to receive an internal mechanical stop 82 for limiting travel of grip 62 in an upwards (i.e., away from the first engagement member 68) or downwards direction within the elliptical aperture 78 of shaft 66, likewise preventing displacement of grip 62 from shaft 66. In the preferred embodiment grip 62, internal mechanical stop 82 is a pin oriented transversely through the through hole 80 and elliptical aperture 78. The shaft 66 may be configured to be any length to allow a variety of sets and configurations with any number of leveling blocks 20.

The preferred receiver 90 is formed by a base 94 and a shank 96 extending from the base 94, the shank 96 terminating at an end in opposing relation to the base 94 at a lip 98. The shank 96 may define a passageway 102 therethrough. The shank 96 extends from the base 94 and defines a continuous shank portion 104 and a non-continuous shank portion 106. The continuous shank portion 104 is adjacent and extends directly from the base 94. The non-continuous shank portion 106 is proximate to the end in opposing relation to the base 94 and may terminate at the lip 98. In the preferred embodiment, the lip 98 may be a projecting edge that extends substantially laterally (i.e., substantially perpendicular) from the shank 96. The non-continuous shank portion 106 is ideally formed by one or more slits 108 in the shank 96 to allow the top portion, or non-continuous portion 106, of the shank 96 to slightly compress as the receiver 90 moves into the narrower section (i.e., top portion 40) of the channel 38 and expand once the lip 98 is positioned above a first shoulder 52 formed in the channel 38 for an interlocking, snap fit, as will be described further below. In the preferred embodiment, the passageway 102 defines a second engagement member 92 therein, the second engagement member 92 capable of mechanically engaging a portion of the handle 60, namely the first engagement member 68, to secure the plurality of stacked leveling blocks 20 between the grip 62 and the receiver 90. In the embodiment illustrated in the figures, the second engagement member 92 may be an internal thread provided within the passageway 102 of the shank 96. The receiver 90 may be made of a relatively lightweight, yet durable and sturdy material having a high strength to weight ratio, such as molded plastic, thermoplastic, or composite. By way of example only and not limitation, the receiver 90 may be made of hard plastic material or lightweight metal material. Although the preferred leveling block set 10 is described with external threads configured to engage internal threads, one of ordinary skill in the art would understand that the intent of the instant disclosure is to describe a system with a handle capable of mechanically engaging a removable receiver to retain a plurality of leveling blocks together. The engagement members 68, 92 described herein are illustrated as external threads, and internal threads, respectively, however other mechanisms such as hooks and catches, male and female snaps, biasing members and recesses, hook-and-loop material, and other engagement members as are known in the art also fall within the scope of this disclosure. In the event that the receiver 90 is lost or damaged, a damaged receiver 90 may be removed from the channel 38 and a replacement receiver 90 may be inserted into the channel 38 to restore the functionality of the leveling block set 10 without needing to replace any of the leveling blocks 20.

In the preferred embodiment as depicted in FIG. 5, the channel 38 formed through the leveling block 20 may define a top portion 40 adjacent the recess 44 in top surface 24 of the leveling block 20 and a bottom portion 42 adjacent the bottom surface 28 of the leveling block 20. In one embodiment, the top portion 40 of the channel 38 is slightly narrower in diameter than the bottom portion 42 of the channel 38 to facilitate a tight interference fit when inserting the receiver 90 into the channel 38. The top portion 40 of the channel 38 preferably defines a first shoulder 52 configured to retain a portion of the receiver 90, namely the lip 98 of the receiver 90. As the receiver 90 is inserted into the channel 38, the non-continuous portion 106 of the shank 96 may flex until the lip 98 passes the first shoulder 52, causing the non-continuous portion 106 and lip 98 to expand outward whereby lip 98 will be retained by the first shoulder 52. The first shoulder 52 is configured to prevent the downward movement of the receiver 90 within the channel 38 so that the receiver 90 may remain within the channel 38 even when the first engagement member 68 is not engaged with the second engagement member 92. The bottom portion 42 of the channel 38 defines a second shoulder 54 configured to engage a portion of the receiver 90, namely the base 94 of the receiver 90. As the first engagement member 68 of the handle 60 engages the second engagement member 92 of the receiver 90, a frictional interference fit is achieved. The second shoulder 54 is configured to prevent the base 94 of the receiver 90 from entering and passing through the bottom portion 42 of the channel 38. In the preferred embodiment, the second shoulder 54 of the channel 38 and the base 94 of the receiver 90 define a polygonal shape so that as the first engagement member 68 engages the second engagement member 92, the receiver 90 is prevented from rotating within the channel 38. In alternative embodiments, the channel 38 may define a polygonal shape to prevent the handle 60 from rotating within the channel 38.

Figure 8:
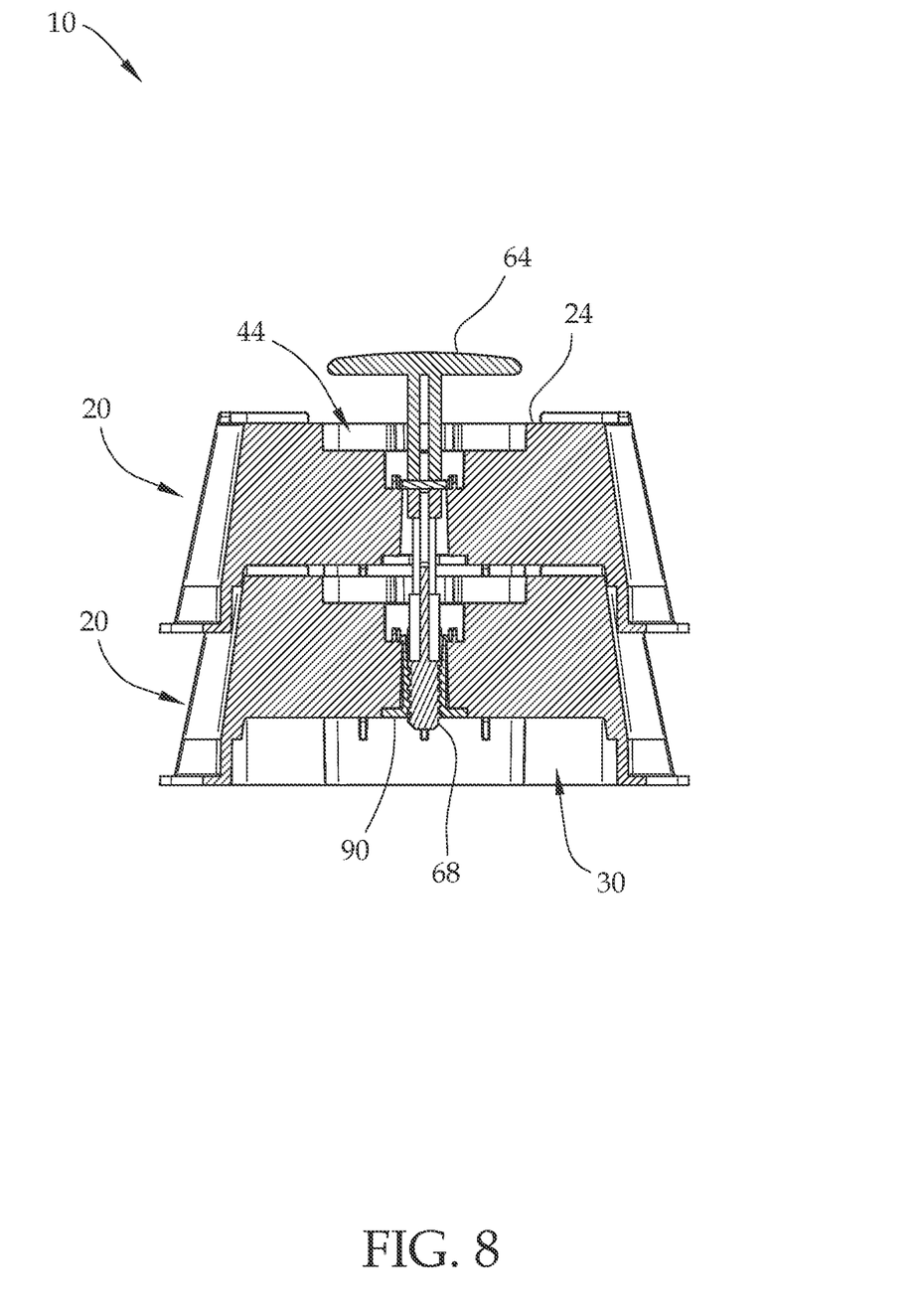
FIG. 8 shows a cross-sectional view of the leveling block set of FIG. 5 in an assembled configuration with the handle in a transport position.

FIG. 7 shows an elevational cross-sectional side view of the preferred leveling block set 10 of FIG. 5 in an assembled configuration with the handle 60 in a stored position. It should be noted that the assembled configuration is also useful for displaying the leveling block set 10, for example in a retail store, such that a potential purchaser may immediately view and readily ascertain the functional design, geometry and aesthetics of the leveling blocks 20. Each void 30 is preferably configured (i.e., sized, shaped, and otherwise capable) to receive at least a portion of a first of the plurality of leveling blocks 20 that is configured to be received within the void 30' of a second of the plurality of leveling blocks 20'. If desired, the void 30 of one leveling block 20 and the corresponding body 22 of another leveling block 20 may define a releaseable interference fit therebetween. In the preferred embodiment however, the void 30 and the body 22 of another leveling block 20 define a somewhat loose fit, such that the leveling blocks 20 readily align together in a stacked configuration, especially when subjected to a compression loading, yet without sliding (for example, displacing in a lateral direction) relative to one another. In this manner, adjacent leveling blocks 20, 20' may be interlocked together in a stacked configuration. FIG. 8 shows an elevational cross-sectional side view showing the leveling block set 10 of FIG. 5 in an assembled configuration with the handle 60 in a transport position. When in the transport position, the grip 62 of the handle 60 is lifted out of the recess 44 until the internal mechanical stop 82 inserted through the through hole 80 and elliptical aperture 78 abuts the upper longitudinal limit of the elliptical aperture 78 formed in the shaft 66, thereby limiting further vertical movement of the grip 62 relative to the shaft 66.

The illustrations and examples provided herein are for explanatory purposes and are not intended to limit the scope of the appended claims.

We claim:

1. A leveling block set (10) comprising,
   a plurality of leveling blocks (20) for leveling a vehicle, each leveling block (20) comprising a body (22) having an opening (36) formed therethrough;
   a handle (60) comprising a grip (62) and a shaft (66), the grip (62) positioned at a first end of the handle (60), the shaft (66) extending from the grip (62) and terminating at a second end, the first end and the second end in opposing relation to one another, the second end defining a first engagement member (68); and
   a receiver (90) removable from the body (22) of the plurality of leveling blocks (20) and defining a second engagement member (92);
   wherein the shaft (66) is configured to be inserted through the opening (36);
   wherein the first engagement member (68) and the second engagement member (92) are configured to releasable secure the plurality of leveling blocks (20) together;
   wherein at least one of the plurality of leveling blocks (20) further comprises a top surface (24), a bottom surface (28), and a sidewall (26), the sidewall (26) extending outwardly and downwardly from the top surface (24) and terminating at a flange (32), the flange (32) forming an aperture to form a void (30) defined by the sidewall (26) and the bottom surface (28) of the at least one of the plurality of leveling blocks (20), wherein at least a portion of a first of the plurality of leveling blocks (20) is configured to be received within the void (30') of a second of the plurality of leveling blocks (20');
   wherein the opening (36) of the top surface (24) extends through the body (22) of at least one of the plurality of the leveling blocks (20), so that the opening (36) is in communication with the void (30) via a channel (38);
   wherein the receiver (90) is configured to be removably positioned within the channel (38);
   wherein the receiver (90) is defined by a base (94) and a shank (96), the shank (96) extending from the base (94) and terminating at a lip (98); and
   wherein the channel (38) defines a first shoulder (52) and a second shoulder (54), the first shoulder (52) configured to retain a portion of the lip (98) therein; the second shoulder (54) configured to retain a portion of the base (94) therein.

2. The leveling block set (10) of claim 1, wherein at least one of the plurality of leveling blocks (20) defines a top surface (24) further defining a recess (44) configured to receive at least a portion of the handle (60) therein.

3. The leveling block set (10) of claim 2, wherein the recess (44) and opening (36) are concentric.

4. The leveling block set (10) of claim 2, wherein the recess (44) is configured to receive a full width ("W") of the grip (62) therein, so that a top surface (64) of the grip (62) is positioned below a plane defined by the top surface (24) of at least one of the plurality of leveling blocks (20).

5. The leveling block set (10) of claim 1, wherein the sidewall (26) extends outwardly in a tapered manner from the top surface (24).

6. The leveling block set (10) of claim 1 further comprising a bar (46) carried by the sidewall (26), the bar (46) configured to define a handhold for manual engagement of at least one of the plurality of leveling blocks (20).

7. The leveling block set (10) of claim 1 further comprising a rib (34) positioned on the top surface (24), the rib (34) configured to retain at least one of the plurality of leveling blocks (20) proximate the top surface (24).

8. The leveling block set (10) of claim 1, wherein the shank (96) defines a passageway (102) therethrough and forming the second engagement member (92) therein.

9. The leveling block set (10) of claim 8, wherein passageway (102) is configured to receive at least a portion of the shaft (66) of the handle (60) therein, facilitating access to the second engagement member (92) by the first engagement member (68).

10. The leveling block set (10) of claim 9, wherein the first engagement member (68) of the handle (60) defines a first plurality of external threads; wherein the second engagement member (92) of the receiver (90) defines a second plurality of internal threads; and wherein the first plurality of external threads and the second plurality of internal threads define a complementary thread pattern.

11. The leveling block set (10) of claim 1, wherein the shaft (66) further defines a central longitudinal recess (74) configured to receive a portion of the grip (62) therein.

* * * * *